United States Patent
Kamiya

(10) Patent No.: US 10,641,337 B2
(45) Date of Patent: May 5, 2020

(54) CRANKSHAFT BEARING SUPPORT STRUCTURE

(71) Applicant: KABUSHIKI KAISHA TOYOTA JIDOSHOKKI, Kariya-shi, Aichi-ken (JP)

(72) Inventor: Yoshiaki Kamiya, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 30 days.

(21) Appl. No.: 15/873,982

(22) Filed: Jan. 18, 2018

(65) Prior Publication Data

US 2018/0202389 A1    Jul. 19, 2018

(30) Foreign Application Priority Data

Jan. 19, 2017  (JP) .................. 2017-007356

(51) Int. Cl.
| | | |
|---|---|---|
| *F02F 7/00* | (2006.01) | |
| *F16C 35/00* | (2006.01) | |
| *F16C 35/067* | (2006.01) | |
| *F16C 9/02* | (2006.01) | |
| *F16C 35/02* | (2006.01) | |

(Continued)

(52) U.S. Cl.
CPC ............ *F16C 35/00* (2013.01); *F02F 7/0053* (2013.01); *F16C 9/02* (2013.01); *F16C 9/03* (2013.01); *F16C 17/022* (2013.01); *F16C 35/02* (2013.01); *F16C 35/067* (2013.01); *F16C 39/02* (2013.01)

(58) Field of Classification Search
CPC .......... F16C 9/03; F16C 17/022; F16C 17/22; F16C 39/02
See application file for complete search history.

(56) References Cited

U.S. PATENT DOCUMENTS 2,086,304 A  *  7/1937  Schwemlein ........... F16C 35/00
                                                     384/444
3,274,815 A  *  9/1966  Roemer .................. F16C 33/14
                                                     72/152

(Continued)

FOREIGN PATENT DOCUMENTS

DE       19838745 A1     3/2000
EP        2119899 A1    11/2009

(Continued)

*Primary Examiner* — Kevin R Steckbauer
(74) *Attorney, Agent, or Firm* — Sughrue Mion, PLC

(57) ABSTRACT

A crankshaft bearing support structure includes a cylinder block having a first holding portion; a first plain bearing held by the first holding portion of the cylinder block; a crank cap fastened to the cylinder block, the crank cap having a second holding portion; a second plain bearing held by the second holding portion of the crank cap; and a crankshaft having an axis of rotation, the crankshaft being rotatably held by the first plain bearing and the second plain bearing and configured to receive an explosive load from a piston via a connecting rod. The crankshaft flexes, when subjected to the explosive load, in a direction of the explosive load. The crank cap in provided with a mechanism which causes the second holding portion to flex in a manner that a bearing holding surface of the second holding portion follows flexure of the crankshaft subjected to the explosive load.

3 Claims, 8 Drawing Sheets

(51) Int. Cl.
*F16C 39/02* (2006.01)
*F16C 17/02* (2006.01)
*F16C 9/03* (2006.01)

(56) References Cited

U.S. PATENT DOCUMENTS

| | | | | | |
|---|---|---|---|---|---|
| 3,411,378 | A | * | 11/1968 | Borgeaud | F16C 9/04 74/579 R |
| 3,455,614 | A | * | 7/1969 | Dickinson | F16C 9/02 384/457 |
| 4,520,770 | A | * | 6/1985 | Ogawa | F02F 7/0053 123/195 H |
| 4,569,109 | A | * | 2/1986 | Fetouh | B23D 31/003 29/413 |
| 4,684,267 | A | * | 8/1987 | Fetouh | B23D 31/003 384/294 |
| 4,911,117 | A | * | 3/1990 | Nishimura | F02F 7/0007 123/195 H |
| 6,203,203 | B1 | * | 3/2001 | Schaefer | F16C 9/02 384/294 |
| 6,431,759 | B1 | * | 8/2002 | Luchner | F16C 9/02 29/898 |
| 8,690,440 | B2 | * | 4/2014 | Mochida | F16C 9/02 384/432 |
| 2002/0126924 | A1 | * | 9/2002 | Okamoto | F16C 9/04 384/276 |
| 2011/0013862 | A1 | * | 1/2011 | Nakamure | F02F 7/0053 384/457 |
| 2013/0170774 | A1 | * | 7/2013 | Mochida | F16C 9/02 384/91 |
| 2018/0149110 | A1 | * | 5/2018 | Iqbal | F02F 7/0053 |

FOREIGN PATENT DOCUMENTS

| | | | |
|---|---|---|---|
| JP | 56125523 | U | 9/1981 |
| JP | 57148039 | U * | 9/1982 |
| JP | 57148039 | U | 9/1982 |
| JP | 0828544 | A | 2/1996 |
| JP | 0861378 | A | 3/1996 |
| JP | 2008-089093 | A | 4/2008 |
| JP | 2009-222087 | A | 10/2009 |
| JP | 2015-132368 | A | 7/2015 |

* cited by examiner

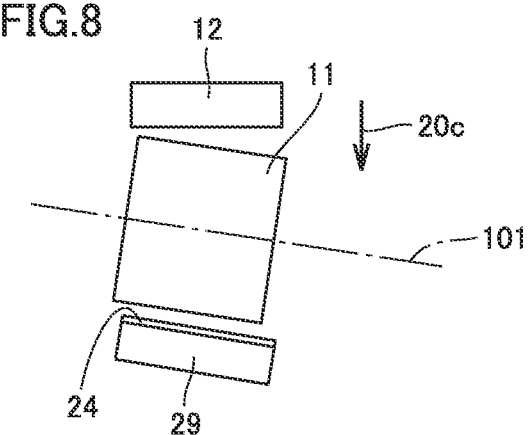

CRANKSHAFT BEARING SUPPORT STRUCTURE

This nonprovisional application is based on Japanese Patent Application No. 2017-007356 filed on Jan. 19, 2017 with the Japan Patent Office, the entire contents of which are hereby incorporated by reference.

BACKGROUND OF THE INVENTION

Field of the Invention

The present invention relates to a crankshaft bearing support structure.

Description of the Background Art

Conventional crankshaft bearing support structures are disclosed in, for example, Japanese Patent Laying-Open No. 2009-222087 (JP '087), Japanese Patent Laying-Open No. 2015-132368 (JP '368), and Japanese Patent Laying-Open No. 2008-89093 (JP '093).

JP '087 discloses upper and lower effective bearing widths that are each set as a function of a pressure exerted, to optimize the oil film thickness and reduce friction. JP '368 discloses a crankshaft bearing support structure which provides a groove in a bearing to equalize the effects of reduction of frictions produced in crank journals. JP '093 discloses a support structure which employs a split structure for a crank cap to eliminate a step at a mating surface between the crank cap and a cylinder block, thereby reducing friction. A problem with the conventional crankshaft bearing support structures is that a plain bearing on the crank cap is prone to wear-away.

Thus, the present invention is made to solve the above problem and an object of the present invention is to provide a crankshaft bearing support structure which prevents a plain bearing on the crank cap side from wearing away.

The inventor studied carefully the cause of wear-away of the plain bearing on the crank cap side. An explosive load on a piston is transferred to the crankshaft through a connecting rod, at which time a downward force in a direction from the top dead center toward the bottom dead center is applied to the crankshaft, causing the crankshaft to flex. The load on the crankshaft is transferred to the plain bearing held by the crank cap having a high rigidity. The inventor has found that the plain bearing on the crank cap side comes into one-sided contact with the flexed crankshaft, at an edge in the direction of the axis of rotation of the crankshaft, causing an oil film to be discontinued, ending up with a solid contact between the crankshaft and the plain bearing. Then, the inventor has found that the above problem can be overcome by reducing the holding strength of the plain bearing on the crank cap side and thereby causing the crank cap and the plain bearing to follow flexure of the crankshaft.

SUMMARY OF THE INVENTION

Based on the above findings, a crankshaft bearing support structure includes a cylinder block having a first holding portion; a first plain bearing held by the first holding portion of the cylinder block; a crank cap fastened to the cylinder block, the crank cap having a second holding portion; a second plain bearing held by the second holding portion of the crank cap; and a crankshaft having an axis of rotation, the crankshaft being rotatably held by the first plain bearing and the second plain bearing and configured to receive an explosive load from a piston via a connecting rod. The crankshaft flexes, when subjected to the explosive load, in a direction of the explosive load. The crank cap in provided with a mechanism which causes the second holding portion to flex in a manner that a bearing holding surface of the second holding portion follows flexure of the crankshaft subjected to the explosive load.

The crankshaft bearing support structure thus configured includes the crank cap having the mechanism which causes the second holding portion to flex in the manner that the bearing holding surface of the second holding portion follows the flexure of the crankshaft subjected to the explosive load. Thus, the second holding portion and the second plain bearing held by the second holding portion flex in the direction of the flexure. As a result, a great portion of the surface of the second plain bearing comes into contact with the crankshaft. Consequently, one-sided contact of the second holding portion with the crankshaft is prevented, thereby preventing the second plain bearing from wearing away.

Preferably, the mechanism includes pairs of bolt-fastening points provided in the crank cap, the bolt-fastening points in the pairs being located on opposite sides of the second holding portion in an axial direction of the crankshaft and being located on opposite sides of the crankshaft when viewed from the axial direction of the crankshaft. In this case, the bolt-fastening points are provided on the opposite sides of the second holding portion, thereby facilitating the second holding portion to follow the flexure of the crankshaft, as compared to the case where the bolt-fastening points are provided in the second holding portion. Further, since the bolt-fastening points in the pairs are provided on the opposite sides of the crankshaft, the crankshaft can be held from both sides.

Preferably, the bolt-fastening points in the pairs are provided in projecting portions projecting from opposite surfaces of the second holding portion in the axial direction of the crankshaft and integrally formed with the second holding portion, and the crank cap includes surfaces facing the cylinder block and provided with grooves between the second holding portion and the projecting portions, the grooves extending along a longitudinal direction of the second holding portion. In this case, the forces of the bolt-fastening points to hold the second holding portion are weak near the grooves, thereby facilitating the second holding portion to follow the flexure of the crankshaft.

Preferably, the mechanism includes one of a groove and a through-hole provided in the second holding portion, the one of the groove and the through-hole being formed in an arcuate shape along an arcuate surface of the second holding portion which holds the second plain bearing, the one of the groove and the through-hole having a depth in the axial direction of the crankshaft. In this case, the one of the groove and the through-hole having a depth in the axial direction of the crankshaft is provided in the arcuate shape along the arcuate surface holding the second plain bearing of the second holding portion, thereby reducing the strength of the second holding portion around the portion holding the second plain bearing. Consequently, the portion, of the second holding portion, holding the second plain bearing is facilitated to follow the flexure of the crankshaft.

Preferably, the mechanism includes round or plain chamfered edges provides in a surface of the second holding portion facing the cylinder block. In this case, the surface of the second holding portion that comes in contact with the first holding portion has the edges that are round chamfered or plain chamfered. Thus, contact area between the second holding portion and the first holding portion is reduced, facilitating oscillation of the second holding portion relative to the first holding portion.

According to the present invention, the crankshaft bearing support structure which prevents the plain bearing on the crank cap side from wearing away is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a schematic view of the crankshaft bearing support structure of the crank cap according to Embodiment 1.

DESCRIPTION OF THE PREFERRED EMBODIMENTS

Figure 1:
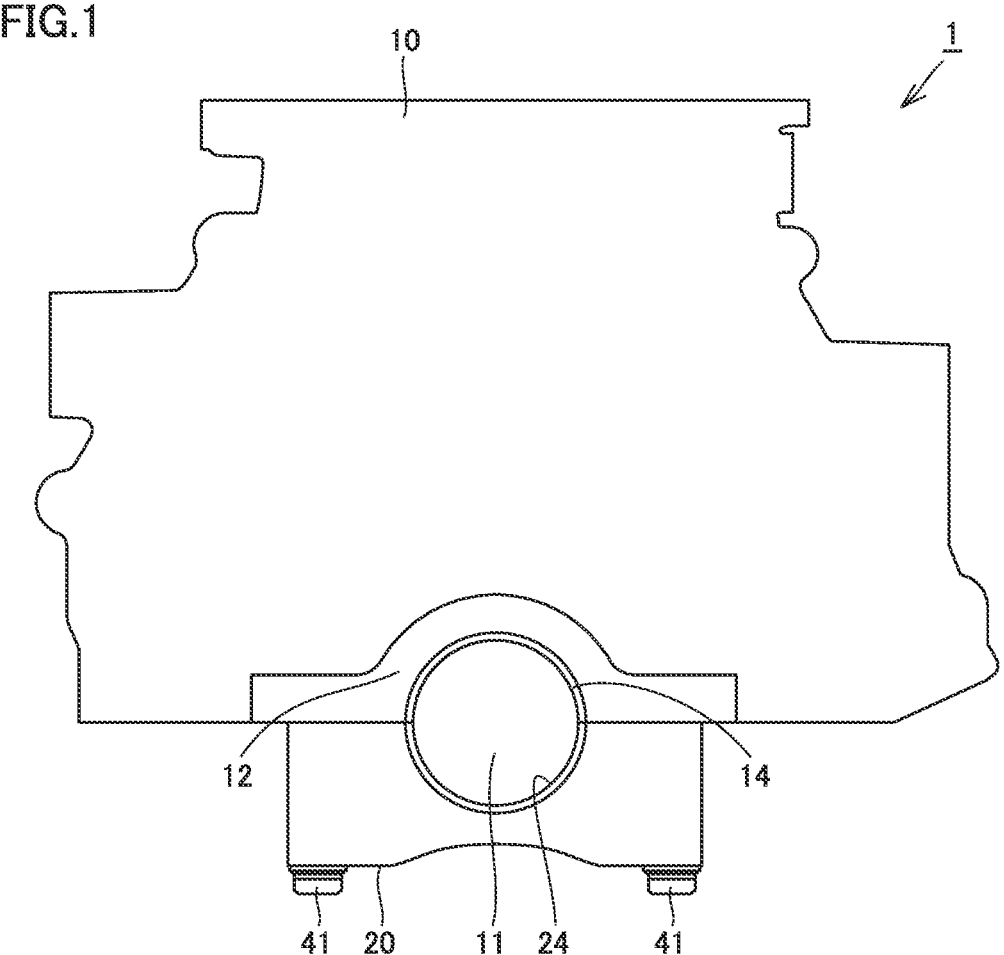
FIG. 1 is a section view of a crankshaft bearing support structure according to Embodiment 1 of the present invention.

Hereafter, crankshaft bearing support structures according to various embodiments of the present invention are described, with reference to the accompanying drawings. In the description below, the same reference sign is used to refer to the same or corresponding component in the drawings, and description thereof will not be repeated.

Embodiment 1

FIG. 1 is a section view of a crankshaft bearing support structure according to Embodiment 1 of the present invention. As shown in FIG. 1, the crankshaft bearing support structure 1 includes: a cylinder block 10; a first plain bearing 14 held by the cylinder block 10; a crank cap 20 fastened to the cylinder block 10; a second plain bearing 24 held by the crank cap 20; and a crankshaft 11 which is rotatably held by the first plain bearing 14 and the second plain bearing 24 and is configured to receive the explosive load from a piston via a connecting rod. The cylinder block 10 has a first holding portion 12 which holds the first plain bearing 14. The crank cap 20 has a second holding portion 29 which holds the second plain bearing 24.

The crank cap 20 is fastened to the cylinder block 10 by bolts 41. The crankshaft 11 is located between the cylinder blocks 10 and the crank caps 20. The crankshaft 11 has crank journals, crankpins to which connecting rods are attached, and crank arms connecting the crank journals and the crankpins. FIG. 1 illustrates a crank journal portion. The first plain bearing 14 and the second plain bearing 24 hold the crank journal.

Lubricating oil is present between the crankshaft 11 and the inner circumferential surfaces of the first plain bearing 14 and the second plain bearing 24. Although the crankshaft 11 makes a sliding motion between the first plain bearing 14 and the second plain bearing 24, sliding friction is very small due to the presence of the lubricating oil between the crankshaft 11 and the first plain bearing 14 and the second plain bearing 24. In the present embodiment, the crankshaft 11 is disposed extending in the forward and rearward direction of a vehicle. The shapes of the first plain bearing 14 and the second plain bearing 24 are semi-cylinders which form one cylinder.

Figure 2:
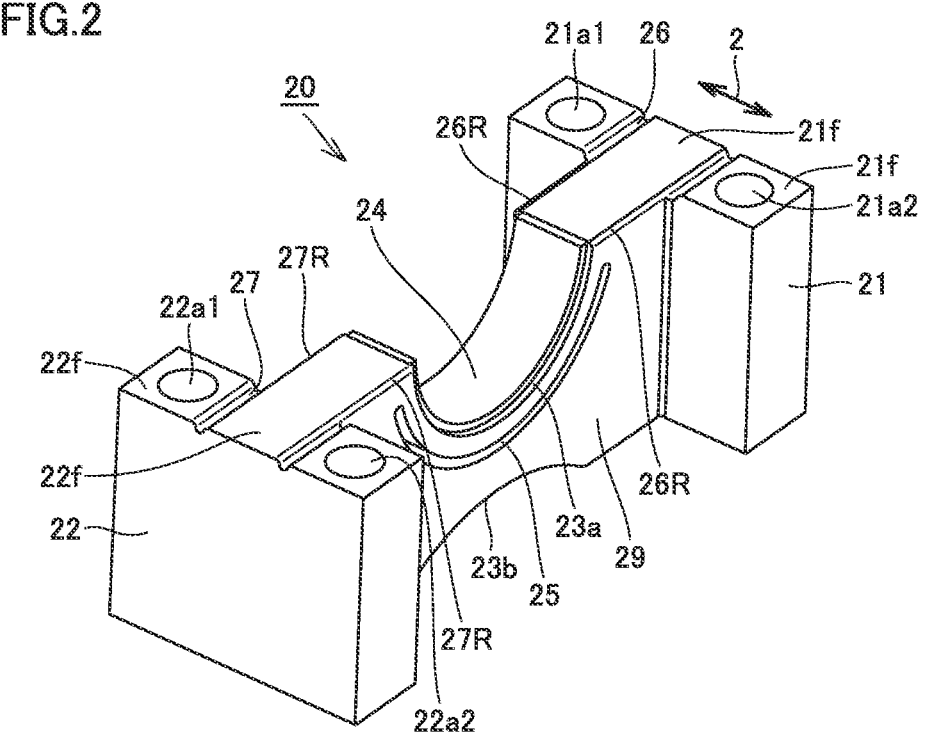
FIG. 2 is a perspective view of a crank cap according to Embodiment 1.

FIG. 2 is a perspective view of the crank cap according to Embodiment 1. As shown in FIG. 2, the crank cap 20 includes: first projecting portions 21 extending in parallel to the crankshaft 11 and fastened to the cylinder block 10; second projecting portions 22 extending in parallel to the crankshaft 11 and fastened to the cylinder block 10, the second projecting portions 22 facing the first projecting portions 21; a second holding portion 29 connecting the first projecting portions 21 and the second projecting portions 22.

The first projecting portions 21 and the second projecting portions 22 are respectively provided with bolt-fastening points 21a1 and 21a2 and bolt-fastening points 22a1 and 22a2 that are offset relative to the second holding portion 29. The bolt-fastening points 21a1, 21a2, 22a1, 22a2 are fastened to the cylinder block 10 by bolts.

The bolt-fastening points 21a1, 21a2 and the bolt-fastening points 22a1, 22a2 are located facing each other with the crankshaft 11 in between. The bolt-fastening points 21a1, 22a1 and the bolt-fastening points 21a2, 22a2 are located facing each other with the second holding portion 29 in between. Since the bolt-fastening points 21a1, 21a2, 22a1, 22a2 are provided offset relative to the second holding portion 29, the second holding portion 29 is facilitated to oscillate, following flexure of the crankshaft, as compared to the case where the bolt-fasteners are provided in the second holding portion 29. The crank cap 20 has pairs of bolt-fastening points, that is, a pair of the bolt-fastening points 21a1, 21a2 and a pair of the bolt-fastening points 22a1, 22a2, on opposite sides of the second holding portion 29 in the axial direction of the crankshaft 11. The bolt-fastening points 21a1, 21a2 and the bolt-fastening points 22a1, 22a2 in the pairs are provided on opposite sides of the crankshaft 11 when viewed from the axial direction of the crankshaft 11. In other words, the bolt-fastening points 21a1, 21a2 are disposed on one side of the crankshaft 11 in the axial direction, and the bolt-fastening points 22a1, 22a2 are disposed on the other side of the crankshaft 11 in the axial direction.

The bolt-fastening points 21a1 and 21a2 are provided in the first projecting portions 21, and the bolt-fastening points 22a1 and 22a2 are provided in the second projecting portions 22. The first projecting portions 21 and the second projecting portions 22 are projecting from opposite surfaces of the second holding portion 29 in the axial direction of the crankshaft, and integrally formed with the second holding portion 29. The crank cap 20 includes surfaces facing the cylinder block 10 and provided with grooves 26, 27 extending along the longitudinal direction of the second holding portion 29 between the second holding portion 29 and the first projecting portions 21 and between the second holding portion 29 and the second projecting portions 22. Due to the grooves 26, bonded areas between the second holding portion 29 and the first projecting portions 21 are reduced. As a result, oscillation of the second holding portion 29 is facilitated. Due to the grooves 27, bonded areas between the second holding portion 29 and the second projecting portions 22 are reduced. As a result, oscillation of the second holding portion 29 is facilitated.

The surfaces of the second holding portion 29 that face the cylinder block 10 include radii 26R, 27R as round chamfers. The chamfers may be plain chamfers. Portions of the radii 26R, 27R are provided along the grooves 26, 27. The second holding portion 29 being provided with the radii 26R on the opposite surfaces reduces the area of a contact surface 21f between the two radii 26R. Providing the second holding portion 29 with the radii 27R on the opposite surfaces reduces the area of a contact surface 22f between the two radii 27R. As a result, the second holding portion 29 is facilitated to oscillate in the forward and rearward direction (the direction in which the crankshaft 11 extends) of the vehicle indicated by an arrow 2 about the contact surfaces 21f, 22f, as compared to the case without the radii 26R, 27R.

The second holding portion 29 holds the second plain bearing 24. The second plain bearing 24 includes a material that is retentive of the lubricating oil, for example, a sintered metallic body. The second plain bearing 24 is fit into an arcuate first recess 23a of the second holding portion 29. A second recess 23b is provided opposite the first recess 23a. Providing the second recess 23b opposite the first recess 23a allows reduction of the strength of the second holding portion 29 between the first recess 23a and the second recess 23b.

The second holding portion 29 includes a groove 25 provided in an arcuate shape along the arcuate surface holding the second plain bearing 24. The groove 25 has a depth in the axial direction of the crankshaft 11. The groove 25 may or may not extend through the second holding portion 29 in the thickness direction of the second holding portion 29. Moreover, while the groove 25 having a predetermined length in the arcuate direction is provided in the present embodiment, the groove 25 may be a through-hole having a short length in the arcuate direction. Plural through-holes or grooves 25 may be provided. The depth direction of the groove 25 or the through-hole coincides with the axial direction of the crankshaft 11. Providing the groove 25 or the through-hole allows reduction of the strength of the second holding portion 29.

The first projecting portions 21 and the second projecting portions 22 extend in a direction parallel to the direction indicated by the arrow 2. The second holding portion 29 extends in a direction perpendicular to the direction indicated by the arrow 2. The crank cap has the groove 25 or the through-hole, the grooves 26, 27, and the radii 26R, 27R, as a mechanism (a flexure follow-up mechanism) which causes the second holding portion 29 to flex in a manner that the bearing holding surface of the second holding portion 29 follows flexure of the crankshaft subjected to the explosive load. There is no need to provide all of them. At least any of the groove 25 or the through-hole, the grooves 26, 27, and the radii 26R, 27R may be provided.

Figure 3:
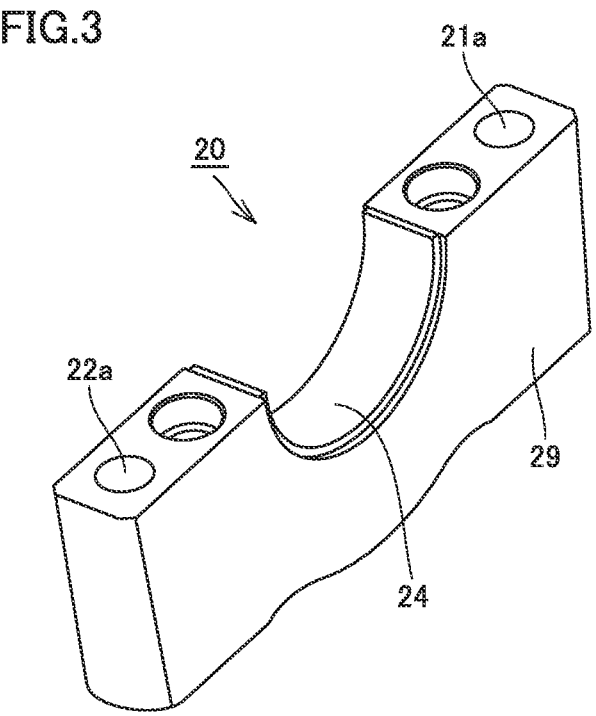
FIG. 3 is a perspective view of a comparison crank cap.

FIG. 3 is a perspective view of a comparison crank cap. The comparison crank cap 20 has the second holding portion 29 provided with bolt-fastening points 21a, 22a. The second holding portion 29 holds the second plain bearing 24. Since the second holding portion 29 is provided with the bolt-fastening points 21a, 22a, it is difficult for the second holding portion 29 to flex, following flexure of the crankshaft.

Figure 4:
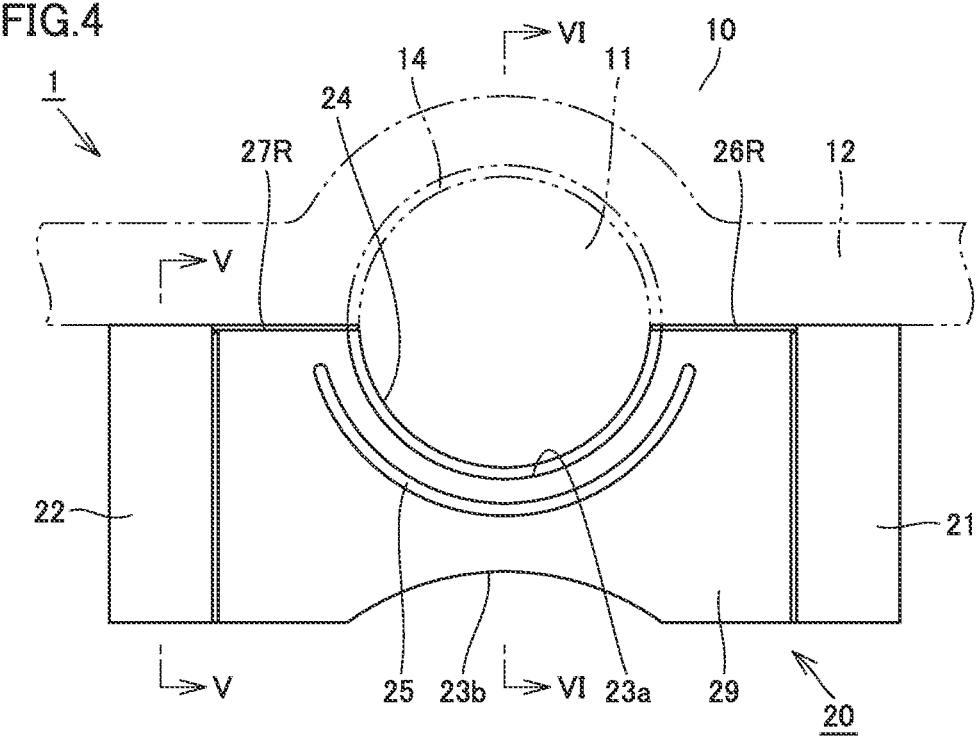
FIG. 4 is a front view of the crank cap according to Embodiment 1 attached to a cylinder block.

FIG. 4 is a front view of the crank cap according to Embodiment 1 attached to the cylinder block 10. As shown in FIG. 4, the crank cap holds the crankshaft 11, which is a rotating body, between the first plain bearing 14 and the second plain bearing 24. The radii 26R, 27R are provided in areas of the second holding portion 29 that are in contact with the first holding portion 12. The groove 25 is provided spaced from the second plain bearing 24. The groove 25 is provided extending along the second plain bearing 24, without reaching the radii 26R, 27R. In the crank cap 20, a thickness necessary for reliability is left below the second plain bearing 24. The first holding portion 12 which holds the first plain bearing 14 is not provided with a structure like the groove 25.

Figure 5:
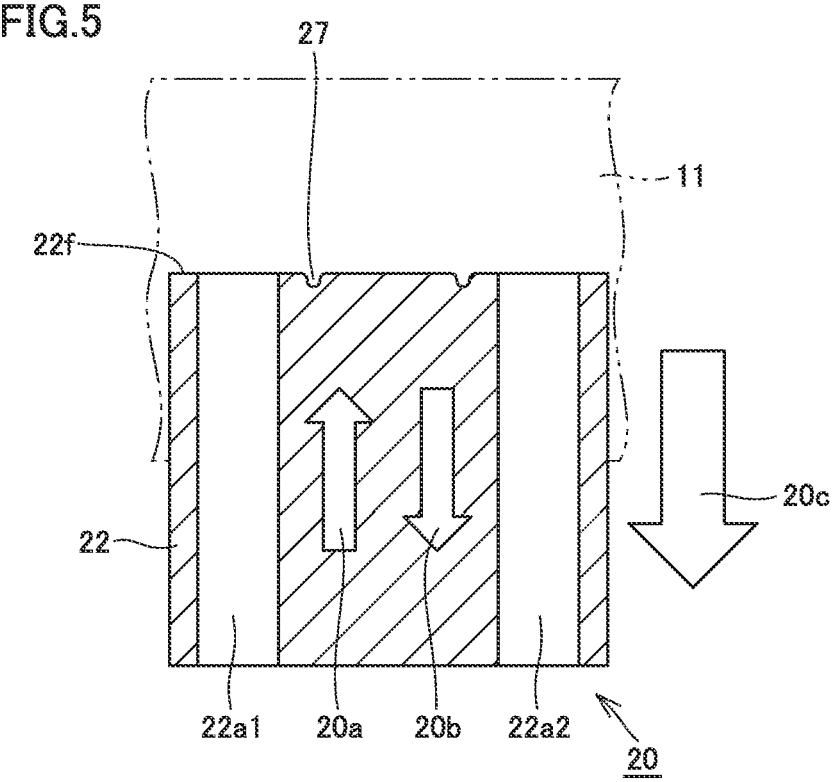
FIG. 5 is a section view of the crank cap according to Embodiment 1, taken along a line V-V in FIG. 4.

FIG. 5 is a section view of the crank cap 20, taken along a line V-V in FIG. 4. As shown in FIG. 5, the crank cap 20 holds the crankshaft 11. An explosive load is applied to the crankshaft 11 in a direction indicated by an arrow 20c, from the piston via a connecting rod. Due to the load, a downward force indicated by an arrow 20b is applied to the arrow 20c side of the crank cap 20, and an upward force indicated by an arrow 20a is applied to the far side of the crank cap 20 from the arrow 20c.

Figure 6:
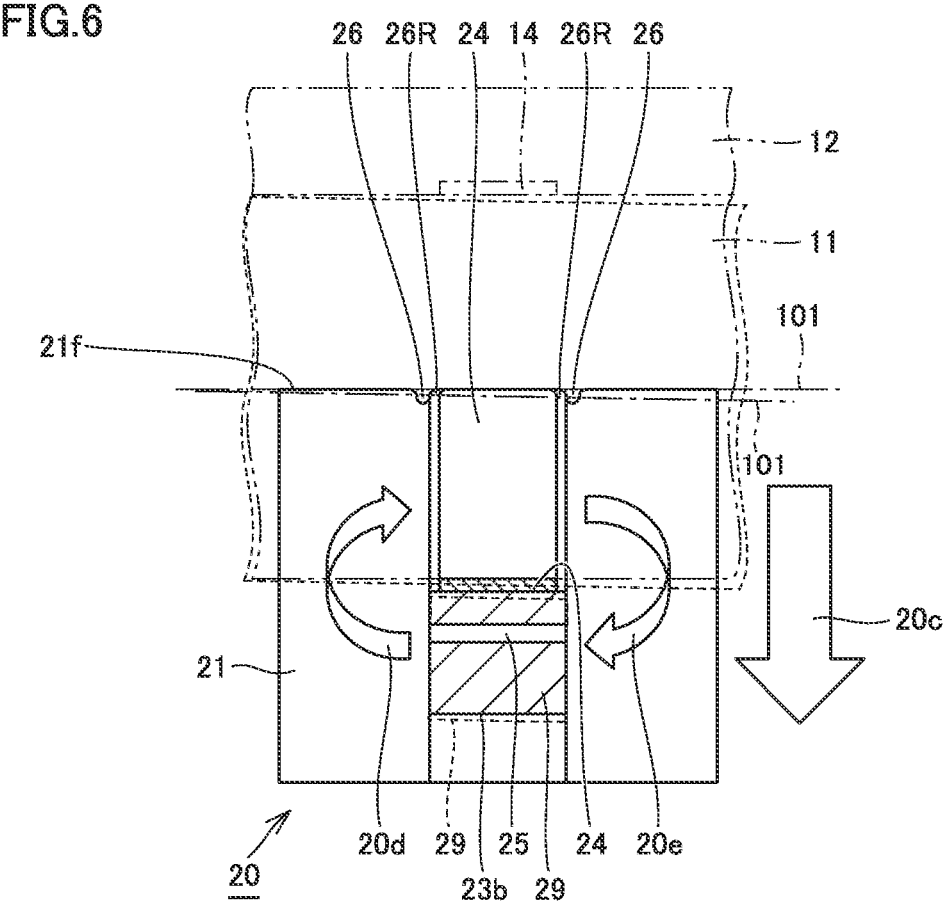
FIG. 6 is a section view of the crank cap according to Embodiment 1, taken along a line VI-VI in FIG. 4.

FIG. 6 is a section view of the crank cap 20, taken along a line VI-VI in FIG. 4. As shown in FIG. 6, normally (when unloaded), the crankshaft 11 is present at a position indicated by the two-dot chain line. As a load caused by explosion is applied in the direction indicated by the arrow 20c, the crankshaft 11 flexes as indicated by the dotted line. This flexure of the crankshaft 11 is transferred to the second plain bearing 24. As a result, forces twisted in directions indicated by arrows 20d, 20e are applied to the second holding portion 29 and the second plain bearing 24, respectively. Since the flexure follow-up mechanism is provided which causes the second holding portion 29 to flex, following in the direction of the flexure of the crankshaft 11, the second holding portion 29 and the second plain bearing 24 on the second holding portion 29 move to the positions indicated by the dotted lines.

In other words, when subjected to the explosive load, an axis 101 of rotation of the crankshaft 11 flexes along the direction of the explosive load. In the direction of the flexure of the crankshaft 11, the second holding portion 29 has a strength smaller than the first holding portion 12. As a result, the second holding portion 29 flexes in the direction indicated by the arrow 20c, thereby causing the second holding portion 29 and the second plain bearing 24 on the second holding portion 29 to follow the crankshaft 11. Owing to this, one-sided contact of the second plain bearing 24 with the crankshaft 11 can be avoided. Effects of the present embodiment are to be described, with reference to the crankshaft 11 and the second holding portion 29 schematically shown in FIGS. 7 and 8.

Figure 7:
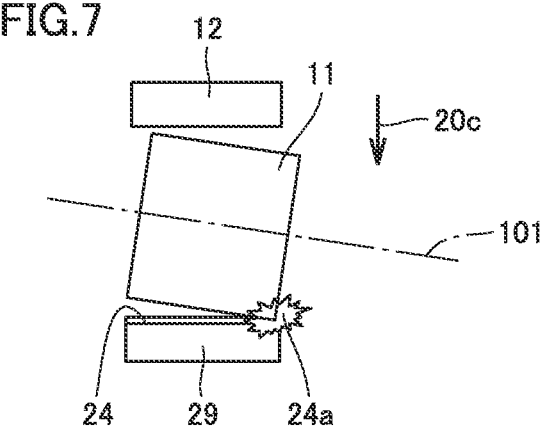
FIG. 7 is a schematic view of a crankshaft bearing support structure of the comparison crank cap.

FIG. 7 is a schematic view of the crankshaft bearing support structure of a comparison crank cap. As shown in FIG. 7, the crankshaft bearing support structure according to the comparison product includes a second holding portion 29 having a great rigidity on the crank cap side. Consequently, an explosive load from a piston is transferred to a crankshaft 11 via a connecting rod, causing the crankshaft 11 to flex, without the second holding portion 29 following the flexure of the crankshaft 11. Consequently, an edge 24a of the second plain bearing 24 comes in solid contact with the crankshaft 11.

FIG. 8 is a schematic view of the crankshaft bearing support structure of the crank cap according to Embodiment 1. As shown in FIG. 8, the explosive load from the piston is transferred to the crankshaft 11 via the connecting rod, causing the crankshaft 11 to flex. Since the second holding portion 29 according to Embodiment 1 has a low strength, as the crankshaft 11 flexes, the second holding portion 29 flexes, following the flexure of the crankshaft 11. As a result, one-sided contact of the second plain bearing 24 with the crankshaft 11 can be prevented. While the grooves 25, 26, 27 and the radii 26R, 27R are provided in the present embodiment, it should be noted that these may not essentially be provided. Instead of providing these, the second plain bearing 24 can be caused to follow the crankshaft 11 by, for example, forming a portion of the second holding portion 29 in the vicinity of the second plain bearing 24, using a low strength material.

While the embodiment of the present invention has been described above, the above disclosure is by way of example in all respects and is not limiting. The technical scope of the present invention is indicated by the appended claims, and all changes that come within the scope of the claims and the meaning and range of equivalency of the claims are intended to be embraced within their scope.

The present invention can be used in the fields of crankshaft bearing support structures.

What is claimed is:

1. A crankshaft bearing support structure, comprising:
   a cylinder block having a first holding portion;
   a first plain bearing held by the first holding portion of the cylinder block;
   a crank cap fastened to the cylinder block, the crank cap having a second holding portion;
   a second plain bearing held by the second holding portion of the crank cap; and
   a crankshaft having an axis of rotation, the crankshaft being rotatably held by the first plain bearing and the second plain bearing and configured to receive an explosive load from a piston via a connecting rod,
   wherein the crankshaft flexes, when subjected to the explosive load, in a direction of the explosive load, and the crank cap includes pairs of bolt-fastening points, the bolt-fastening points in the pairs being located on opposite sides of the second holding portion in an axial direction of the crankshaft and being located on opposite sides of the crankshaft when viewed from the axial direction of the crankshaft, and
   the bolt-fastening points in the pairs are provided in projecting portions projecting from opposite surfaces of the second holding portion in the axial direction of the crankshaft and integrally formed with the second holding portion, and the crank cap includes surfaces facing the cylinder block and provided with grooves between the second holding portion and the projecting portions, the grooves extending in a direction that intersects the axial direction of the crankshaft, so that the second holding portion flexes in a manner that a bearing holding surface of the second holding portion follows flexure of the crankshaft subjected to the explosive load.

2. The crankshaft bearing support structure according to claim 1, wherein
   the crank cap further includes one of an arcuate groove and an arcuate through-hole provided in the second holding portion, formed along an arcuate surface of the second holding portion which holds the second plain bearing, and having a depth in the axial direction of the crankshaft.

3. The crankshaft bearing support structure according to claim 1, wherein
   the crank cap further includes round or plain chamfered edges provided in a surface of the second holding portion facing the cylinder block.

* * * * *